ent Number: 5,125,250
Date of Patent: Jun. 30, 1992

United States Patent [19]
Sun

[54] FLYING SHEAR SYSTEM WITH ADAPTIVE CUT-LENGTH CONTROL AND THE OPERATIONAL METHOD THEREOF

[75] Inventor: Kuan-Yung Sun, Kaohsiung, Taiwan

[73] Assignee: China Steel Corporation, Taiwan

[21] Appl. No.: 692,315

[22] Filed: Apr. 26, 1991

[51] Int. Cl.$^5$ ............................ B21B 1/00; B26D 5/00; B23D 25/00
[52] U.S. Cl. .................................. 72/8; 72/13; 72/203; 83/72; 83/77; 83/288; 83/363
[58] Field of Search ................. 72/8, 14, 15, 203, 338, 72/13; 83/37, 72, 74, 76.4, 76.8, 77, 287, 288, 359, 363; 364/472

[56] References Cited

U.S. PATENT DOCUMENTS

| | | | |
|---|---|---|---|
| 3,170,355 | 2/1965 | Neely, Jr. .............................. | 83/363 |
| 3,331,952 | 7/1967 | Clyne .................................... | 83/72 |
| 3,552,163 | 1/1971 | Lloyd .................................... | 72/203 |
| 3,841,180 | 10/1974 | Gütlbauer et al. .................... | 83/288 |
| 4,397,169 | 8/1983 | Staat ..................................... | 72/203 |

FOREIGN PATENT DOCUMENTS

0036852  9/1981  European Pat. Off. .............. 83/363

*Primary Examiner*—Lowell A. Larson
*Assistant Examiner*—Thomas C. Schoeffler
*Attorney, Agent, or Firm*—Ladas & Parry

[57] ABSTRACT

A bloom is heated and rolled by the flying shear system so as to produce a semi-finish rolled billet having a reduced cross section. A CLSI value, which is indicative of the uniform length of each of a number of product billets that can be cut from the length of the semi-finish rolled billet while maintaining predetermined optimum head and tail scrap lengths, is then calculated by the flying shear system. The cross section of the semi-finish rolled billet is corrected, so as to produce a finish rolled billet having an adjusted length, when the CLSI value is not within a safety billet length range, to thereby obtain a new CLSI value that falls within the safety billet length range. A flying shear cuts the semi-finish rolled billet or the finish rolled billet into the number of product billets when the CLSI value is within the safety billet length range.

7 Claims, 6 Drawing Sheets

FLYING SHEAR SYSTEM WITH ADAPTIVE CUT-LENGTH CONTROL AND THE OPERATIONAL METHOD THEREOF

BACKGROUND OF THE INVENTION

1. Field of the Invention

The invention relates to a flying shear system, more particularly to an adaptive cut-length flying shear system having provisions to regulate the length of bloom tail scrap.

2. Description of the Related Art

Figure 1:
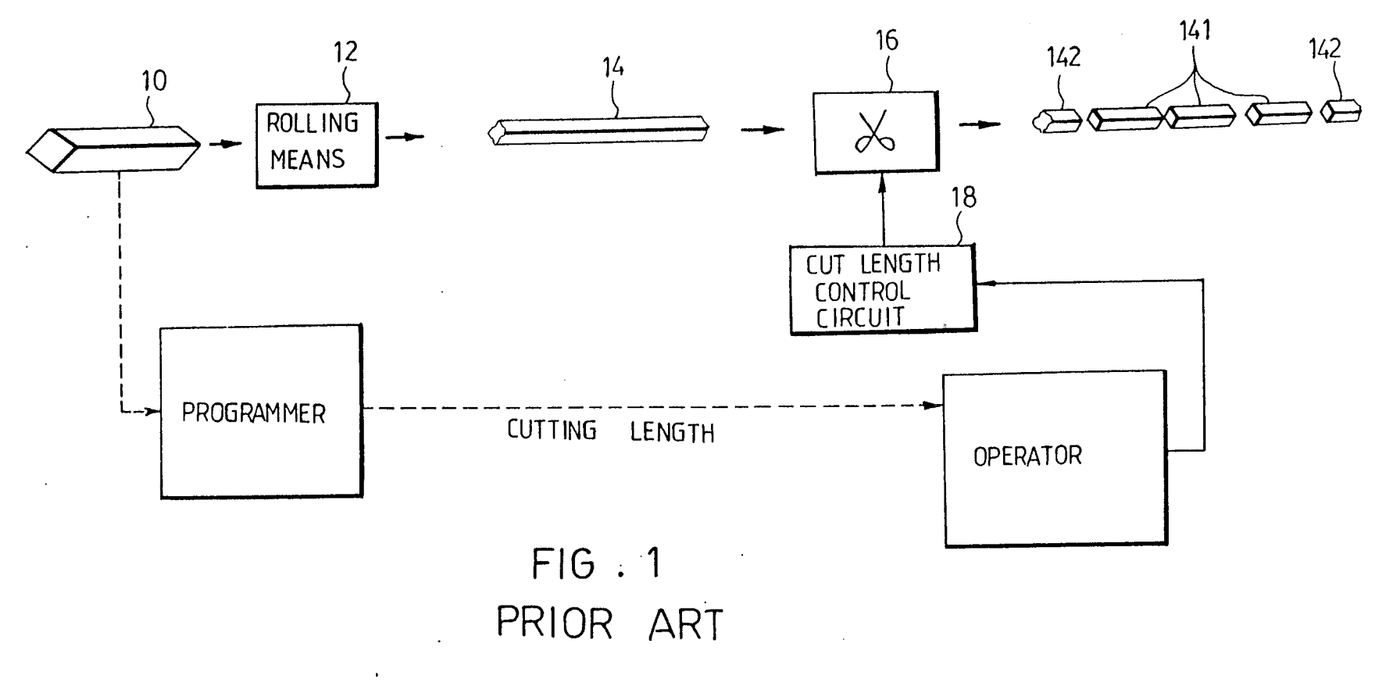
FIG. 1 is a process flow diagram of a conventional flying shear system with static cut-length control.

The process flow diagram of a conventional flying shear system with static cut-length control is shown in FIG. 1. A programmer, through the aid of statistical data and computer programs, can calculate the required weight of bloom from primary bloom information, such as the unit weight per meter of the bloom and the programmed length of bloom. And by using primary billet requirements, such as the unit weight per meter of the product billet and the allowable range of product billet length, the programmer can then calculate the required cutting length. This information is then passed on to an operator, who, after considering other factors, such as metal composition and the billet temperature before cutting, decides the actual cutting length.

Referring once more to FIG. 1, a bloom 10 is fed to a rolling means 12 to produce a finish rolled billet 14 with a reduced cross section. The operator manually operates a cut-length control circuit 18, which in turn controls a flying shear means 16. The output of the flying shear means 16 is a plurality of product billets 141 with head and tail scraps 142.

The disadvantages of using the above described "flying shear system with static cut-length control" are as follows:

1. The conventional flying shear system uses the unit weight per meter of the bloom, and the programmed length of bloom to determine the required weight of bloom. However, the cross section of cast blooms tends to gradually increase because of wearing of the casting molds. The actual length and cross-section of the cast blooms is therefore different from the programmed length and cross-section, and the calculated required weight of bloom is different from the actual required weight of bloom. This is a defect which the conventional flying shear system cannot correct.

2. The conventional flying shear system uses the required weight of bloom, the unit weight per meter of the product billet, and the allowable range of product billet length to determine the required cutting length. However, the cross section of finish rolled billets tends to gradually increase because of wearing of the compression rollers. The actual weight per meter of the product billet is therefore different from the initial weight per meter of the product billet, and the calculated required cutting length is thus also inaccurate.

3. The conventional flying shear system is complicated and requires experienced personnel to properly operate the system.

4. The cut-length control circuit 18 is manually operated. It is thus impractical to compute a required accurate cutting length for each individual finish rolled billet.

5. Tail scrap length produced by the conventional flying shear system ranges from 0 cm to 60 cm. Tail scraps longer than 20 cm means loss of product, while tail scraps shorter than 5 cm can cause operational troubles.

SUMMARY OF THE INVENTION

Therefore, the main objective of the present invention is to provide a flying shear system with adaptive cut-length control so as to optimize the tail scrap length, keeping it within 5 cm and 20 cm.

Another objective of the present invention is to provide a flying shear system in which cutting length control is achieved by a process computer, thereby reducing the required manpower.

Still another objective of the present invention is to provide a flying shear system having provisions to correct irregular rolled billet dimensions.

Yet another objective of the present invention is to provide a flying shear system wherein the required cutting is computed for each individual rolled billet so as to result in a more accurate cut.

Accordingly, the preferred embodiment of a flying shear system of the present invention comprises: a feeding means to feed a bloom of known weight; a furnace means provided after the feeding means so as to heat the bloom; a rolling means provided after the furnace means so as to produce a semi-finish rolled billet having a reduced cross section; means for calculating a CLSI value which is indicative of the uniform length of each of a number of product billets that can be cut from the length of the semi-finish rolled billet with predetermined optimum head and tail scrap length; means for correcting the cross section of the semi-finish rolled billet so as to produce a finish rolled billet having an adjusted length when the CLSI value is not within a safety billet length range, thereby obtaining a new CLSI value that falls within the safety billet length range; a cutting means; and means for controlling the cutting means to cut the semi-finish rolled billet or the finish rolled billet into the number of product billets when the CLSI value is within the safety billet length range.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
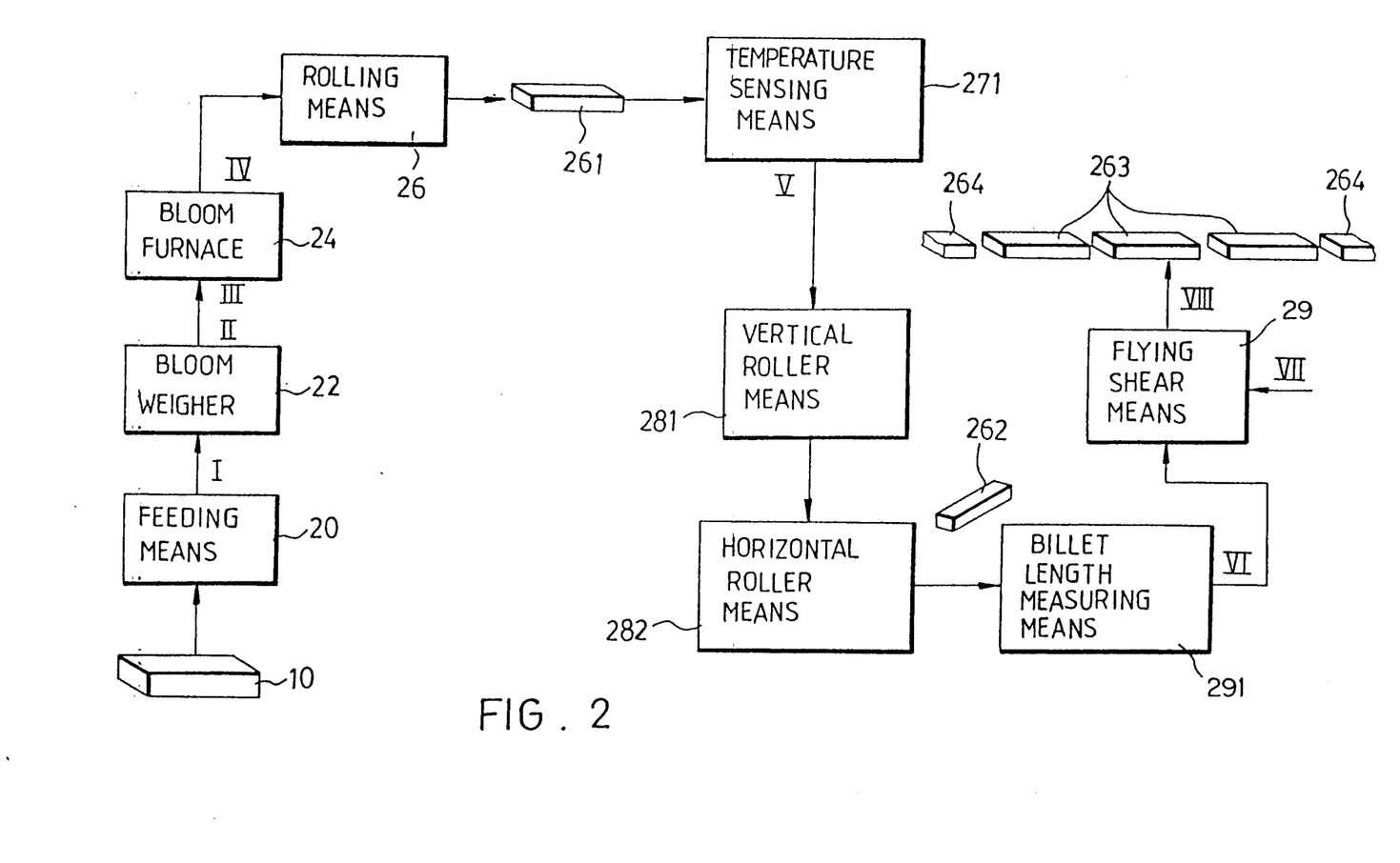
FIG. 2 is a process flow diagram of the preferred embodiment of a flying shear system with adaptive cut-length control according to the present invention.

A process flow diagram of the preferred embodiment of a flying shear system with adaptive cut-length control according to the present invention is shown in FIG. 2. A bloom feed signal (I) is generated whenever a bloom 10 is properly provided on a feeding means 20 of the preferred embodiment. The actual weight of the bloom 10 is accurately measured by a bloom weigher 22 having a bloom weight signal output (II). Bloom furnace entry and exit signals, (III) and (IV), are generated whenever the weighed bloom 10 passes through a bloom furnace 24. The heated bloom 10 is then fed to a rolling means 26 to produce a semi-finish rolled billet 261 of a desired reduced cross section. A billet cutting temperature signal (V) is generated by a temperature sensing means 271 provided after the rolling means 26. The cross section of the semi-finish rolled billet 261 is further reduced by vertically and horizontally disposed roller means, 281 and 282, to produce a finish rolled billet 262. A billet length signal (VI) corresponding to the length of a preceding billet is obtained from a billet length measuring means 291. A cutting length signal (VII) is received by and controls the movement of the flying shear means 29 so as to properly cut the finish rolled billet 262 into a desired number of product billets 263. A cutting completion signal (VIII) is immediately generated once cutting of the finish rolled billet 262 has been fully accomplished.

Figure 3:
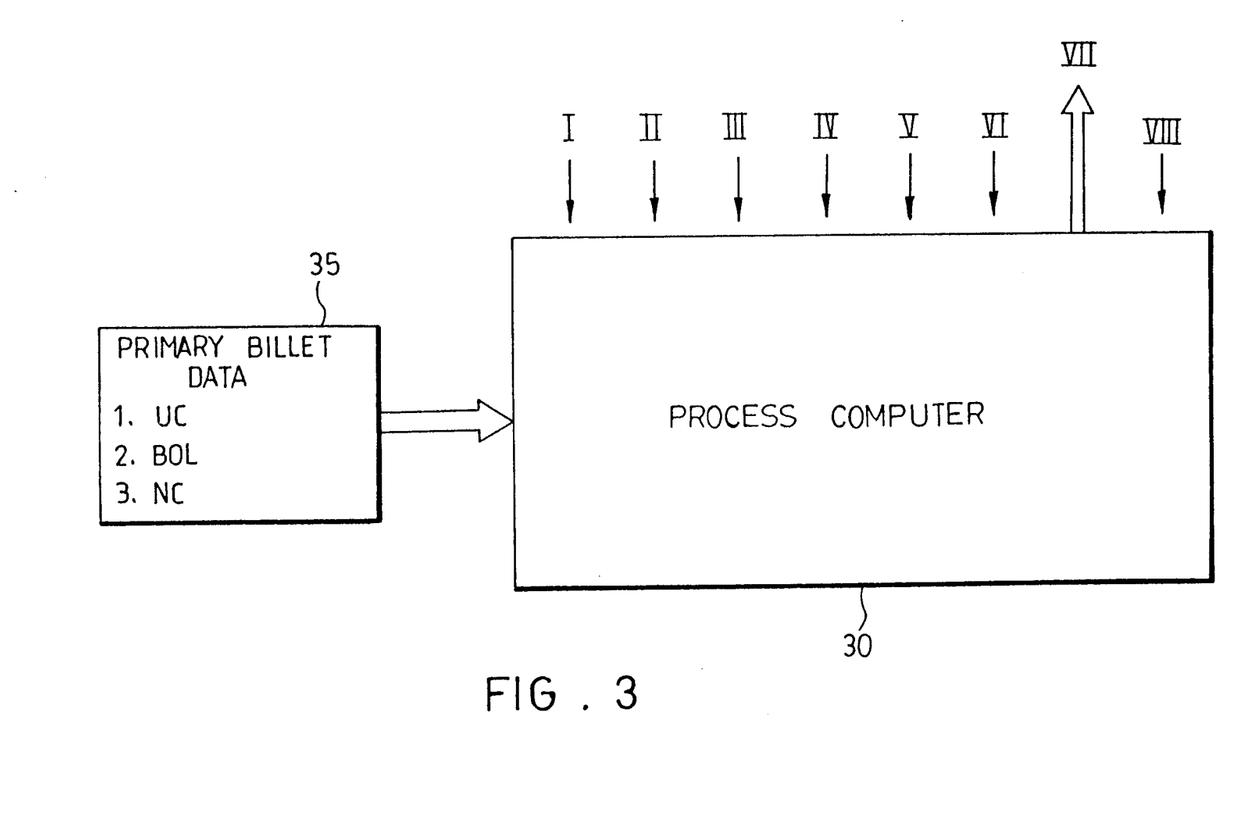
FIG. 3 is a block diagram of a process computer of the flying shear system of the present invention.

Referring to FIGS. 2 and 3, the bloom feed signal (I), the bloom weight signal output (II), the bloom furnace entry signal (III), the bloom furnace exit signal (IV), the billet cutting temperature signal (V), the preceding billet length signal (VI), and the cutting completion signal (VIII) are fed into a process computer 30. Other inputs to the process computer 30 include primary billet data 35, such as metal composition (MC), billet order length (BOL), and the number of cuts per finish rolled billet (NC). The process computer 30 generates the cutting length signal (VII) to control the movement of the flying shear means 29 in order to regulate the length of tail scrap.

Referring once more to FIG. 2, the bloom weigher 22 is disposed a known distance away from the flying shear means 29. During actual use of the preferred embodiment, every bloom sequentially undergoes many processes, such as weighing, heating, rolling, and cutting. A system for tracking the finish rolled billets is thus necessary to the operation of the preferred embodiment. However, since the use and configuration of tracking systems is known in the art, these tracking systems will not be detailed further.

Through the use of tracking systems, one can readily obtain information such as individual finish rolled billet data, turn reports, daily, weekly and monthly reports. Furthermore, a completely on-line operation, such as that of the preferred embodiment, is more efficient and accurate, and requires less manpower.

Figure 4:
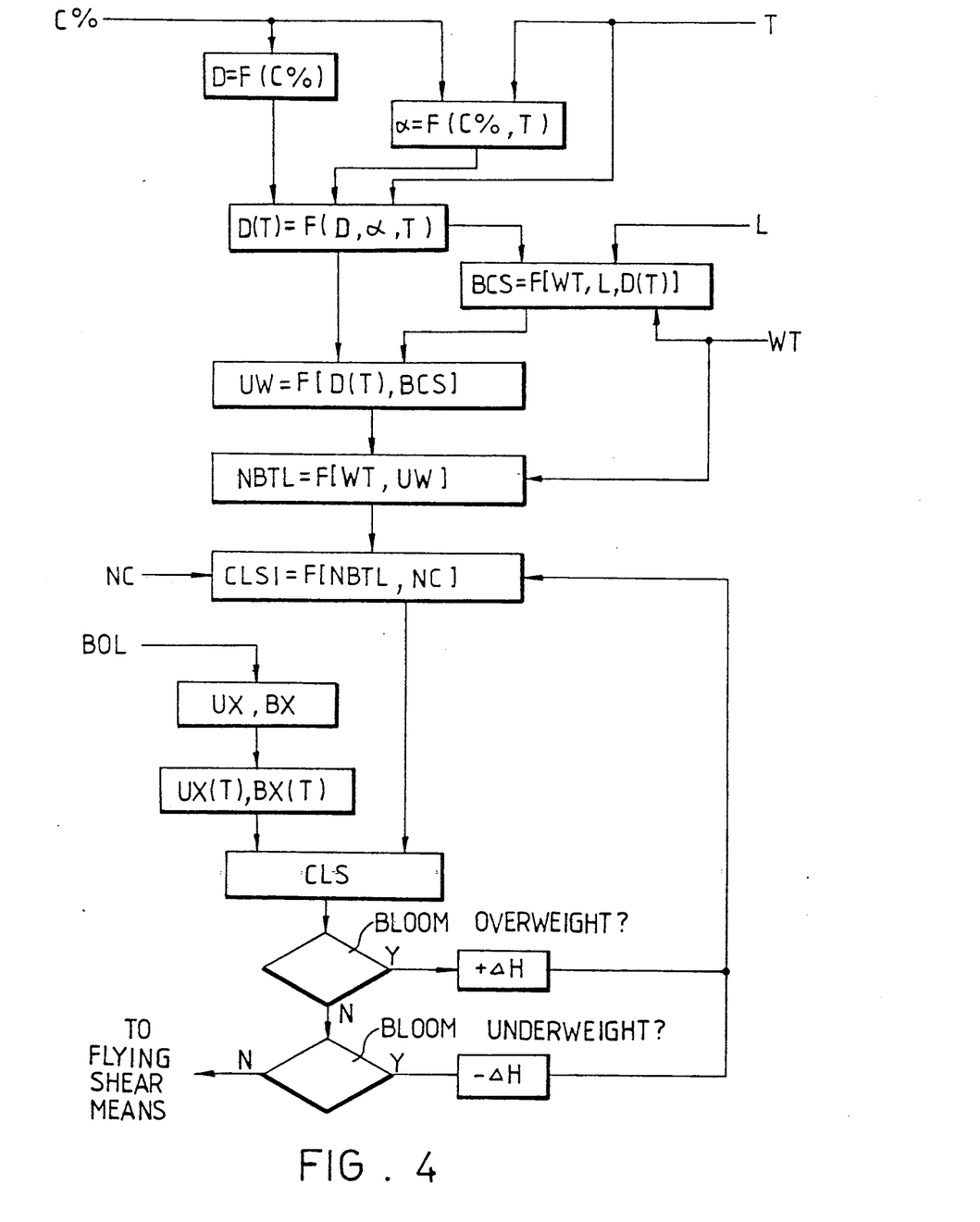
FIG. 4 is a flowchart of the instructions executed by the process computer shown in FIG. 3.

A flowchart of the instructions executed by the process computer 30 is shown in FIG. 4. Six variables are required in the calculation of the cut length setting value (CLS) of the flying shear means. Three of the variables can be obtained from sensors provided in the field: the temperature (in C) of the billet during cutting (T), the length (L) of the billet rolled just before the current bloom being rolled, and the actual weight of the bloom (WT). The remaining three are from primary billet data: the metal carbon content (C %), the number of cuts per finish rolled billet (NC), and the billet order length (BOL).

The first factor to be calculated is the metal density (D) in grams per cubic centimeter at 0° C. Since the dominating factor in determining metal density (D) is the metal carbon content (C %), only C % will be considered in this design. Table 1 illustrates the approximate value of metal density (D) at 0° C. for different ranges of C %. By plotting the data shown in Table 1, a relation curve of D vs. C %, such as that shown in FIG. 5, can be obtained.

Figure 5:
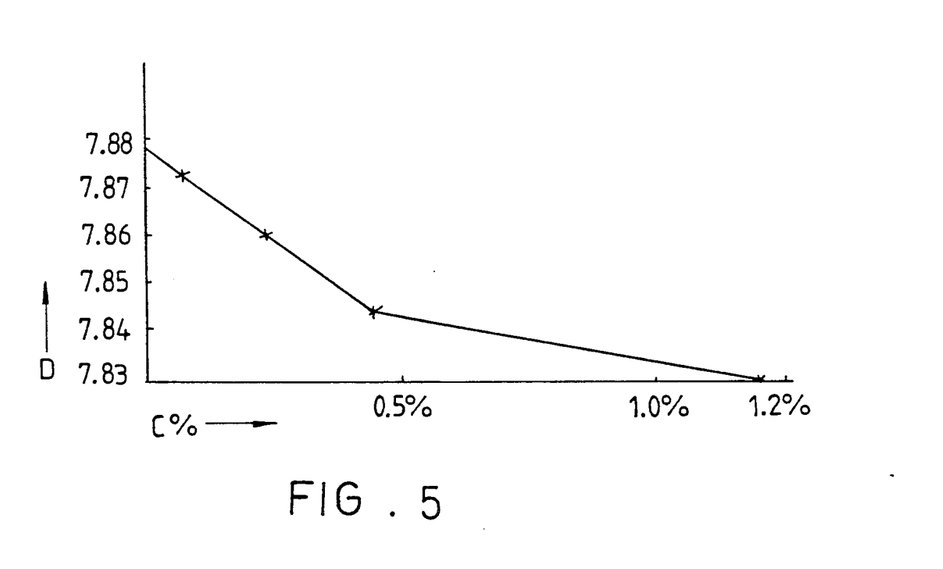
FIG. 5 is a relation curve of the metal density (D) at 0° C. versus the metal carbon content C %.

From FIG. 5, the curve between (C % = 0.06%) and (C % = 0.435%) can be considered as a straight line, and the curve between (C % = 0.435%) and (C % = 1.22%) can be considered as another straight line. A Pascal pseudo expression of D as a function of C % is as follows:

If C % ≦ 0.435%
 then D = 7.8752352 − 0.0705882 × C %
 else D = 7.8517579 − 0.0178343 × C %

Referring once more to FIG. 4, the second factor to be calculated is the metal expansion coefficient (α) as a function of C % and the temperature of the billet during cutting (T). Table 2 illustrates the value of metal expansion coefficient (α) for different ranges of T and C %. A Pascal pseudo expression of α as a function of T and C % is as follows:

```
If C % ≦ 0.06%
  then if T ≦ 900° C.
    then α = (26.91 − 0.0153 T) × 10⁻⁶
    else α = (11.25 + 0.0021 T) × 10⁻⁶
  else if C % ≦ 0.23%
    then if T ≦ 900° C.
      then α = (16.53 − 0.0045 T) × 10⁻⁶
      else α = (6.63 + 0.0068 T) × 10⁻⁶
  else if C % ≦ 0.435%
    then if T ≦ 900° C.
      then α = (6.68 + 0.0063 T) × 10⁻⁶
      else α = (4.25 + 0.009 T) × 10⁻⁶
  else if T = 900° C.
    then α = (7.58 + 0.0083 T) × 10⁻⁶
    else α = (9.2 + 0.0065 T) × 10⁻⁶
```

The third factor to be calculated is the metal density $[D(T)]$ as a function of D, α, and T. This can be obtained from the universal equation:

$$D(T) = D/[1 + \alpha T]^3$$

The next factor to be calculated is the billet cross section (BCS) in square millimeters as a function of the actual weight of the previous bloom (WT) in kilograms, the length (L) of the last finish rolled billet, and the metal density D(T) of the last finish rolled billet.

BCS = WT(last bloom)/[L of last finish billet * D(T)]

The BCS value of a current finish rolled billet is assumed to be equal to the BCS of the previous finish rolled billet.

The unit weight of current finish rolled billet (UW) in kilograms per meter can be calculated as follows [D(t) is the density of current finnish rolled billet]:

$$UW = [gm/cm^3] \times [mm^2] \times 10^{-3}$$
$$= D(T) \times BCS \times 10^{-3}$$

In the preferred embodiment, the optimum head scrap length is 0.25 m, while the optimum tail scrap length is 0.15 m. The net billet length (NBTL) is expressed by the following equation:

$$NBTL = [\text{Bloom actual weight/unit weight}] -$$
$$[\text{Head + tail scrap length}]$$
$$= [WT/UW] - 0.4$$

The initial value of cut-length setting (CLSI) can be determined by dividing NBTL by the number of cuts per finish rolled billet (NC):

$$CLSI = \{[WT/UW] - 0.4\}/NC$$
$$= \{[WT/(D(T) \times BCS \times 10^{-3}]] - 0.4\}/NC$$

It is thus mathematically shown that when the finish rolled billet is cut into the desired number of product billets, each of which having a length of CLSI, the tail scrap length is at the optimum length of 15 cm.

The final flying shear cut-length setting value (CLS) is usually not equal to the billet order length (BOL) since all product billets produced by the flying shear system have to be reheated in the billet furnace before further rolling. Safety ranges of product billet length (BTSR) are established and stored in the memory of the process computer. BTSR is determined by the space between skids of the billet furnace in a downstream factory, such as in a bar mill or rod mill plant. If the billet length does not fall within one of the safety ranges (BTSR), and if this billet is fed into the billet furnace, the billet will fall between the skids and operation of the mill has to be stopped. Thus, billets which fall short of or exceed the safety length ranges should be rejected before being fed into the billet furnace. In the preferred embodiment, there are three safety ranges stored in the process computer: 10.4 m–11.4 m, 12.0 m–12.4 m, and 13.7 m–14.2 m. The following is a Pascal pseudo expression used in selecting an appropriate safety range from the three safety ranges (BTSR):

```
If BOL < 10.4 m
  then alarm for input error
  else if 10.4 m ≦ BOL ≦ 11.4 m
    then X = 3, BX = 10.4 m, UX = 11.4 m
  else if 11.4 m < BOL < 12 m
    then alarm for input error
  else if 12 m ≦ BOL ≦ 12.4 m
    then X = 2, BX = 12 m, UX = 12.4 m
  else if 12.4 m < BOL ≦ 13.7 m
    then alarm for input error
  else if 13.7 ≦ BOL ≦ 14.2 m
    then X = 1, BX = 13.7 m, UX = 14.2 m
  else then alarm for input error
```

The values of the upper and lower limits, UX and BX, of the safety ranges (BTSR) are the values at a temperature of about 390° C., whereas the temperature during billet cutting is T.C. For the purpose of making a more accurate cut, the upper and lower limits, UX and BX, of the safety ranges (BTSR) can be converted from 390° C. to T. The conversion formulas are as follows:

$$BX(T) = BX[1 + \alpha(T - 390)]$$

$$UX(T) = UX[1 + \alpha(T - 390)]$$

wherein X = 1, 2, 3

After selecting the appropriate safety range (BTSR), the final value of CLS is determined according to the following procedure:

| | | |
|---|---|---|
| If UX ≧ CLSI | ≧ BX | Then CLS = CLSI |
| If UX < CLSI | | Then CLS = UX |
| If BX > CLSI | | Then CLS = BX |

Billet overweight is indicated by the following conditions: CLS=UX, and Tail scrap length ≦20 cm. The process computer is capable of sensing the presence of these conditions and correspondingly alarms the operator. When billet overweight occurs, correcting action on the billet cross section (BCS) may be carried out if the operator does not want to cut the long tail scrap.

Figure 6A:
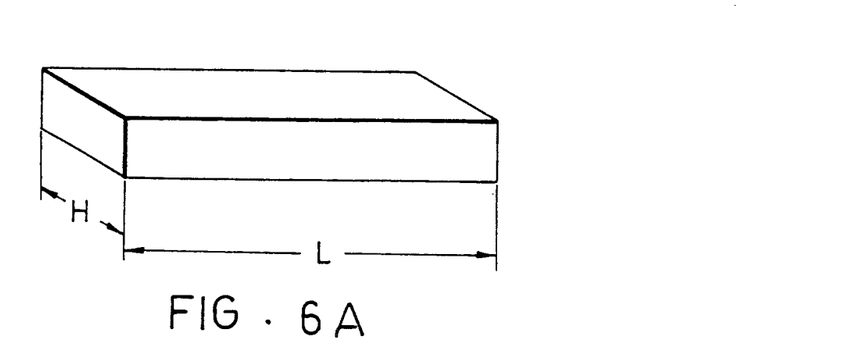
FIG. 6A is a perspective view of an overweighted rolled billet before cross section change.
Figure 6B:
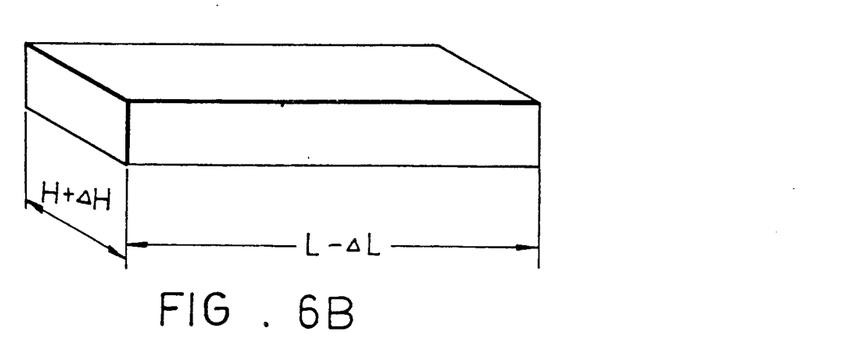
FIG. 6B is a perspective view of the overweighted rolled billet after cross section change.

The rolled billet cross section (BCS) can be increased by following computer guidance. FIG. 6A shows an overweighted rolled billet before cross section change, while FIG. 6B shows the overweighted rolled billet after cross section change. From these Figures, we can obtain the equation:

$$H^2 \times L = (H + \Delta H)^2 \times (L - \Delta L)$$

After simplification, we can obtain the equation:

$$\Delta H = H \times [-1 + \sqrt{1 + (\Delta L/(L - \Delta L))}\,]$$

Billet underweight is indicated by the following conditions: CLS=BX, and Tail scrap length ≦5 cm. The process computer is capable of sensing the presence of billet underweight conditions and correspondingly alarms the operator. The operator can then select one of the following actions:

(1) Ignore the alarm and continue with the cutting process; or (2) Correct the billet cross section (BCS).

Figure 7A:
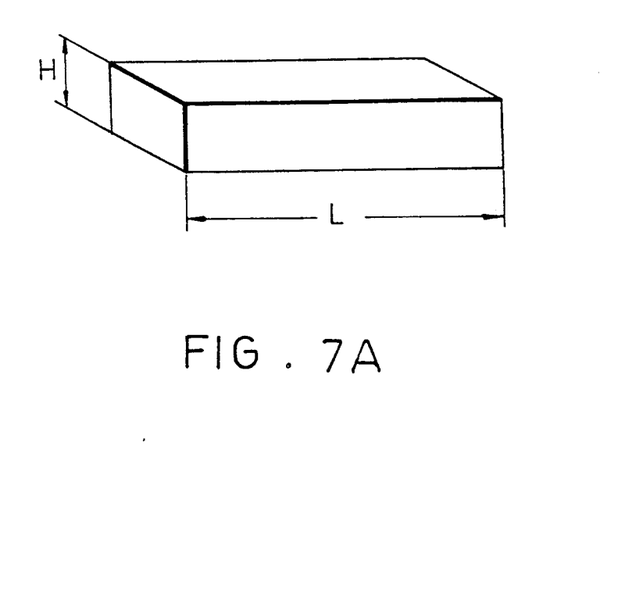
FIG. 7A is a perspective view of an underweighted rolled billet before cross section change.
Figure 7B:
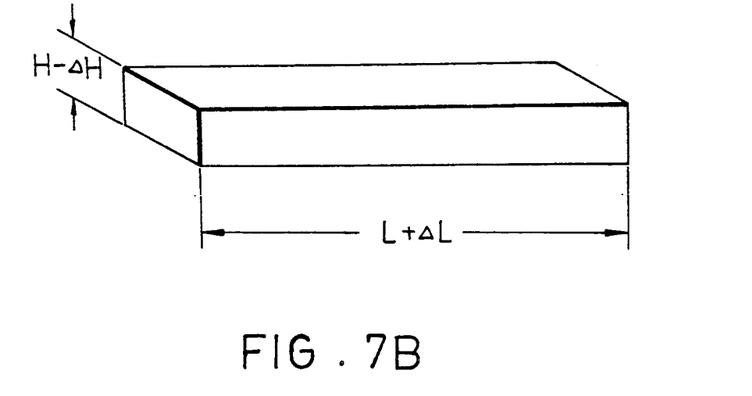
FIG. 7B is a perspective view of an underweighted rolled billet after cross section change.

The rolled billet cross section (BCS) can be decreased by following computer guidance. FIG. 7A shows an underweighted rolled billet surface cross section change, while FIG. 7B shows the underweighted rolled billet after cross section change. From these Figures, we can obtain the equation:

$$H^2 \times L = (H - \Delta H)^2 \times (L + \Delta L)$$

After simplification, we can obtain the equation:

$$\Delta H = H \times [1 - \sqrt{1 - (\Delta L/(L + \Delta L))}\,]$$

The roll gap settings of the horizontally disposed roller means 282 are adjusted once ΔH is known (Refer to FIG. 2). The new value of the finish rolled billet cross section (BCS) is then used to recalculate CLSI. The final value of CLS is one that is within the appropriate safety range (BTSR) and is finally transmitted to the flying shear means 29 as the cutting length signal (VII) so that the finish rolled billet may be properly and accurately cut.

The advantages of using the flying shear system according to the present invention are as follows:

1. The final cutting length setting value (CLS) for each finish rolled billet is not necessarily equal and is chosen so as to permit limiting of the tail scrap length of each finish roller billet to within 5 cm and 20 cm.

2. Since almost all of the operations of the preferred embodiment are fully automated, the flying shear system of the present invention is more accurate and requires less manpower.

3. In a study conducted by China Steel Corporation, prior to the implementation of the flying shear system of the present invention, the scrap loss was running at approximately 1.24% of total bloom charged. After implementing the flying shear system of the present invention, the scrap loss was reduced to approximately 0.89% of total bloom charged. The 0.35% reduction translates into 4,200 MT of additional products for a 1,200,000 MT annual rolling capacity.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

TABLE 1

| C % | D (g/cm$^3$) at 0° C. |
|---|---|
| 0.06% and Below | 7.871 |
| 0.06%–0.23% | 7.859 |
| 0.23%–0.435% | 7.844 |
| 0.435%–1.22% | 7.830 |

TABLE 2

| TC | $\alpha \times 10^{-6}$ | C % | | | |
|---|---|---|---|---|---|
| | | ≦0.06% | ≦0.23% | ≦0.435% | ≦0.81% |
| 0–800° C. | | 14.67 | 12.93 | 11.72 | 14.22 |
| 0–900° C. | | 13.14 | 12.48 | 12.35 | 15.05 |
| 0–1000° C. | | 13.35 | 13.16 | 13.26 | 15.70 |

I claim:

1. A method for cutting a plurality of blooms into a desired number of product billets with predetermined optimum head and tail scrap lengths, comprising steps of:
   successively feeding blooms of known weight;
   successively heating said blooms in a furnace means;
   successively rolling said blooms in a first rolling means after heating so as to product finish rolled billets having reduced cross-sections;
   successively rolling said finish rolled billets in a second rolling means;
   measuring a total length of each of said finish rolled billets downstream of said second rolling means;
   calculating a CLSI value for each of said finish rolled billets, which CLSI value is indicative of a uniform length of each of the product billets that can be cut from each of said finish rolled billets while maintaining predetermined optimum head and tail scrap length, said CLSI value of each of said finish rolled billets being a function of a cross-section of an immediately preceding one of said finish rolled billets, said cross-section of the immediately preceding one of said finish rolled billets being calculated as a function of total length, weight and density of said immediately preceding finish rolled billet;
   adjusting a gap setting of said second roller means so as to correct a cross-section of said finish rolled billets when said CLSI value is not within a safety billet length range so as to produce finish rolled billets having a new CLSI value that falls within said safety billet length range; and
   controlling a flying shear means to cut said finish rolled billets into said desired number of product billets.

2. The cutting method as claimed in claim 1, wherein said calculating step is performed by a process computer means.

3. The cutting method as claimed in claim 1, wherein said calculating step comprises:
   calculating a unit weight of each of said finish rolled billets, said unit weight being a function of a density of said finish rolled billets and the cross-section of said immediately preceding finish rolled billet;
   determining a net billet length of each of said finish rolled billets by subtracting the predetermined optimum head and tail scrap lengths from a quotient of a weight of a respective one of said blooms divided by a unit weight of said finish rolled billet; and
   calculating said CLSI value by dividing said net billet length by a number of cuts needed to cut said finish rolled billets into said desired number of product billets.

4. The cutting method as claimed in claim 3, further comprising a step of measuring a temperature of said finish rolled billets downstream of said first rolling means; and density of said finish rolled billets being calculated as a function of a density of said finish rolled billets at 0° C. and of the temperature of said finish rolled billets downstream of said rolling means.

5. The cutting method as claimed in claim 1, further comprising the steps of:
   obtaining safety ranges of billet length adaptable to a downstream process; and
   selecting one of said safety ranges by determining into which of said safety ranges a billet order length falls.

6. The cutting method as claimed in claim 1, wherein said adjusting step comprises:
   checking if said CLSI value falls within said safety billet length range;
   calculating a change in cross-section required when said CLSI value is not within said safety billet length range so as to obtain a new CLSI value that falls within said safety billet length range; and
   adjusting the gap setting of said second roller means according to the calculated change in cross-section.

7. The cutting method as claimed in claim 6, further comprising a step of generating an alarm signal when said CLSI value is not within said safety billet length range.

* * * * *